(12) United States Patent
Emigh et al.

(10) Patent No.: US 11,776,741 B2
(45) Date of Patent: Oct. 3, 2023

(54) ROTARY ELECTRICAL TRANSFORMER WITH PREFERRED LUBRICANT

(71) Applicant: CR FLIGHT L.L.C., Carmichael, CA (US)

(72) Inventors: Jonathan Emigh, Somerset, CA (US); Randell J. Wishart, Reno, NV (US); Jason Emigh, Somerset, CA (US); Ray Porter, La Verkin, UT (US)

(73) Assignee: CR FLIGHT L.L.C., Carmichael, CA (US)

( * ) Notice: Subject to any disclaimer, the term of this patent is extended or adjusted under 35 U.S.C. 154(b) by 0 days.

(21) Appl. No.: 18/056,798

(22) Filed: Nov. 18, 2022

(65) Prior Publication Data

US 2023/0102299 A1 Mar. 30, 2023

Related U.S. Application Data

(63) Continuation of application No. PCT/US2021/034200, filed on May 26, 2021.

(60) Provisional application No. 63/032,840, filed on Jun. 1, 2020.

(51) Int. Cl.
*H01F 38/18* (2006.01)

(52) U.S. Cl.
CPC ..................... *H01F 38/18* (2013.01)

(58) Field of Classification Search
CPC .......... H01F 38/18; H01F 21/06; H01F 29/10; H02K 13/003; H01R 39/022; H01R 39/08
See application file for complete search history.

(56) References Cited

U.S. PATENT DOCUMENTS

| | | | |
|---|---|---|---|
| 5,679,045 | A | 10/1997 | Niemi |
| 6,400,057 | B2 | 6/2002 | Vesper |
| 8,198,773 | B2 | 6/2012 | Wishart |
| 8,253,294 | B1 | 8/2012 | Wishart |
| 8,531,072 | B2 | 9/2013 | Wishart |
| 9,780,513 | B2 | 10/2017 | Holzapfel |
| 10,116,187 | B1 | 10/2018 | Wishart |
| 10,938,172 | B2 | 3/2021 | Wishart |
| 11,453,286 | B2 | 9/2022 | Wishart |
| 11,462,979 | B2 | 10/2022 | Wishart |

(Continued)

FOREIGN PATENT DOCUMENTS

| | | |
|---|---|---|
| CN | 102251932 A | 11/2011 |
| CN | 104918556 A | 9/2015 |

(Continued)

OTHER PUBLICATIONS

ISA/KR, Korean Intellectual Property Office (KIPO), International Search Report and Written Opinion dated Sep. 15, 2021, related PCT international application No. PCT/US2021/034200, pp. 1-6, with claims searched, 7-10.

(Continued)

*Primary Examiner* — Tuyen T Nguyen
(74) *Attorney, Agent, or Firm* — O'BANION & RITCHEY LLP; James M. Ritchey

(57) ABSTRACT

A rotary transformer for transferring electrical current between a stationary location and a rotating location utilizes paired electrically conducting sintered disks, one stationary and one rotating, wherein the rotating sintered disk rotates on the stationary one and are lubricated with a boundary layer conductor that is a triacylglyceride.

12 Claims, 5 Drawing Sheets

(56) References Cited

U.S. PATENT DOCUMENTS

| | | | |
|---|---|---|---|
| 2001/0033117 A1 | 10/2001 | Vesper | |
| 2012/0218069 A1* | 8/2012 | Stancu | H01F 38/18 336/130 |
| 2017/0217566 A1 | 8/2017 | Ichinose | |
| 2019/0319415 A1 | 10/2019 | Wishart | |
| 2022/0239201 A1* | 7/2022 | Wishart | H02K 7/14 |

FOREIGN PATENT DOCUMENTS

| | | |
|---|---|---|
| CN | 105296116 A | 2/2016 |
| CN | 105684240 A | 6/2016 |
| CN | 107040087 A | 8/2017 |
| CN | 108430213 A | 8/2018 |
| CN | 109749822 A | 5/2019 |
| CN | 110291686 A | 9/2019 |
| WO | 2011098586 | 8/2011 |
| WO | 2011098586 A1 | 8/2011 |
| WO | 2018106611 A1 | 6/2018 |
| WO | 2021247316 A1 | 9/2021 |

OTHER PUBLICATIONS

State Intellectual Property Office of the People's Republic of China, The Second Office Action dated Apr. 12, 2023, related Chinese patent application 202180037199.3, Chinese-language document, pp. 1-7, English-language translation, pp. 8-9, with claims searched, pp. 10-12.

\* cited by examiner

ROTARY ELECTRICAL TRANSFORMER WITH PREFERRED LUBRICANT

CROSS-REFERENCE TO RELATED APPLICATIONS

This application claims priority to, and is a 35 U.S.C. § 111(a) continuation of, PCT international application number PCT/US2021/034200 filed on May 26, 2021, incorporated herein by reference in its entirety, which claims priority to, and the benefit of, U.S. provisional patent application Ser. No. 63/032,840 filed on Jun. 1, 2020, incorporated herein by reference in its entirety. Priority is claimed to each of the foregoing applications.

The above-referenced PCT international application was published as PCT International Publication No. WO 2021/247316 A1 on Dec. 9, 2021, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to a "rotary transformer" or slip ring assembly that permits the passage of electricity between a stationary or fixed environment and a rotating environment. Usually, coupled into the subject invention are electrical sources and/or electrical load consumption devices that utilize the subject technology for power creation and/or power usage. A preferred lubricant or boundary layer conductor (BLC) is utilized with the subject rotary transformer, usually a substantially pure triacylglyceride or mixture of a triacylglyceride and natural or artificial oil material, is utilized to facilitate passage of electricity between a fixed sintered conductive surface and a rotating sintered conductive surface and to minimize wear between the contacting and conductive surfaces during rotation. Exemplary usages, though not limiting, would be in connection with: 1) a wind or flowing liquid generator (electrical source) to a power grid (power usage); 2) a standard motor with rotating field coils (electrical load consumption device) to a power source; 3) a counter-rotating (CR) electric motor assembly (electrical load consumption device) to a power source; and 4) equivalent power supplying to power usage assemblies. Uses include devices in which at least a portion of an apparatus is stationary and another portion of the apparatus rotates and requires a constant flow of electricity during rotational operation. The phrase "rotary transformer" indicates that the subject invention is a device that passes electricity between a stationary environment and a rotational environment and is traditionally termed a slip ring assembly.

More specifically, the subject invention comprises a stationary substrate with a contacting surface and a moving substrate with a contacting surface that slides over the stationary substrate in a manner that brings the two contacting surfaces into close proximity with one another, thereby allowing electricity to pass between them and is lubricated by the boundary layer conductor.

2. Background Discussion

U.S. Pat. Nos. 8,198,773; 8,253,294; and 8,531,072 (issued to the subject Applicant) are for various counter-rotating motor/generator applications.

Of relevance is U.S. Pat. No. 10,116,187 (issued to the subject Applicant and referred to as patent '187) for a Thin-Profile Counter-Rotating Differential Electric Motor Assembly. In particular, this CR motor assembly is specifically for relatively small electric motors, usually less than about 10 lbs of thrust. As is described in patent '187, the CR motor assembly comprises: central solid shaft (either fixed or rotating) having first and second ends; first and second rotational members that rotate in opposite directions about said central solid shaft; first and second propellers secured to the first and second rotational members, respectfully; electromagnetic means to power the rotation associated with the first and second rotational members; and means for conveying electricity into the electromagnetic means from an outside power source that is located between the oppositely rotating rotational members and a mounting means and is secured to the central solid shaft second end. This specific design is ideal for small CR motors in which the mass of the CR motor (mostly the first and second rotational members and electromagnetic means) is relatively small (about <10 lbs of thrust).

In addition, International Publication WO 2018/106611 (also issued to the subject Applicant and referred to as WIPO '611) describes an electricity conveyance means or High Current and RPM-Capable Slip Ring Assembly that can be utilized with the CR motors disclosed in patent '187. However, as with the patent '187 CR motor, this slip ring assembly must be utilized between the first and second rotational member (and associated electromagnetic means) and the mounting means since the electrical wires run from the power source to the outside of the slip ring assemble. The central shaft or axel is solid for this slip ring assemble. To position this slip ring assembly within or above the first and second rotational members (to bring the mass of the first and second rotational member and electromagnetic means closed to the mounting means) is impossible due to the oppositely rotating propellers tangling with the electrical wires.

BRIEF SUMMARY

An object of the technology described herein is to provide a rotary transformer that transmits electricity between a stationary or fixed environment and a rotating environment.

An additional object of the technology described herein is to provide a rotary transformer that transmits a substantially power between a stationary or fixed environment and a rotating environment.

Another object of the technology described herein is to furnish a rotary transformer comprised of at least one set of paired lubricates disks with one stationary or fixed and the other rotating.

A further object of the technology described herein is to supply a rotary transformer comprised of a plurality of sets of paired lubricated disks with one stationary or fixed disk and the one rotating disk in each set.

Still another object of the technology described herein is to disclose a rotary transformer comprised of a single pair or a plurality of sets of paired sintered disks with one stationary or fixed disk and the one rotating disk in each set with all sets lubricated by a boundary layer conductor to facilitate reduced rotational friction and to promote the transmission of electricity.

Still an additional object of the subject invention is to disclose a rotary transformer comprised of a plurality or sets of paired sintered disks with one stationary or fixed disk and the one rotating disk in each set with all sets lubricated with a triacylglyceride or triacylglyceride/oil mixture lubricant to facilitate reduced rotational friction and to promote the transmission of electricity.

Still yet another object of the subject technology is to relate a rotary transformer comprised of a plurality or sets of paired sintered disks with one stationary or fixed disk and the one rotating disk in each set with all sets lubricated with a lubricant containing castor oil or a castor oil/oil mixture to facilitate reduced rotational friction and to promote the transmission of electricity.

Disclosed is a rotary transformer or slip ring assembly for use in a selected application for transferring electrical power between a stationary exterior environment and a rotating interior environment, comprising: a non-rotating electrical conductor, comprising: a first sintered metallic contacting surface and a first electrical connection coupling said non-rotating electrical conductor to a stationary exterior member; a rotating electrical conductor, comprising a second sintered metallic contacting surface and a second electrical connection coupling the rotating electrical conductor to a rotating interior member; and a boundary layer conductor applied to both the first and second sintered metallic contacting surfaces to facilitate motion of the second sintered metallic contacting surface over the first sintered metallic contacting surface during rotation, while allowing electrical current to flow between the non-rotating and said rotating electrical conductors. Further, the layer conductor is a triacylglyceride. Additionally, the boundary layer conductor is a hydroxylated and unsaturated triacylglyceride. Still further, the boundary layer conductor is castor oil.

Further disclosed is a rotary transformer or slip ring assembly for transmitting electricity between a first stationary location and a second rotating location, comprising: a pair of electrically conductive disks with each disk having a central aperture that comprise: a first stationary sintered disk having an inner aperture edge and an outer perimeter edge and a second rotating sintered disk having an inner aperture edge and an outer perimeter edge; a first stationary location electrical connection attached to the first stationary sintered disk's outer aperture edge; a second rotating location electrical connection attached to the second rotating sintered disk's inner perimeter edge; a spindle housing surrounding the pair of electrically conductive disks, wherein the spindle housing permits the pair of electrically conductive disks to rotate on one another; and a boundary layer conductor applied to both the first stationary and the second rotating sintered disks to facilitate motion of the first and second disks during rotation, while allowing electrical current to flow between the stationary and rotating electrically conductive disks.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Referring more specifically to the drawings, for illustrative purposes the subject technology is embodied in the system generally shown in FIGS. 1 through 5. It will be appreciated that the subject system rotating electrical connector may vary as to configuration and as to details of the components, and that the method may vary as to the specific steps and sequence of operation, without departing from the basic concepts as disclosed herein.

Figure 4:
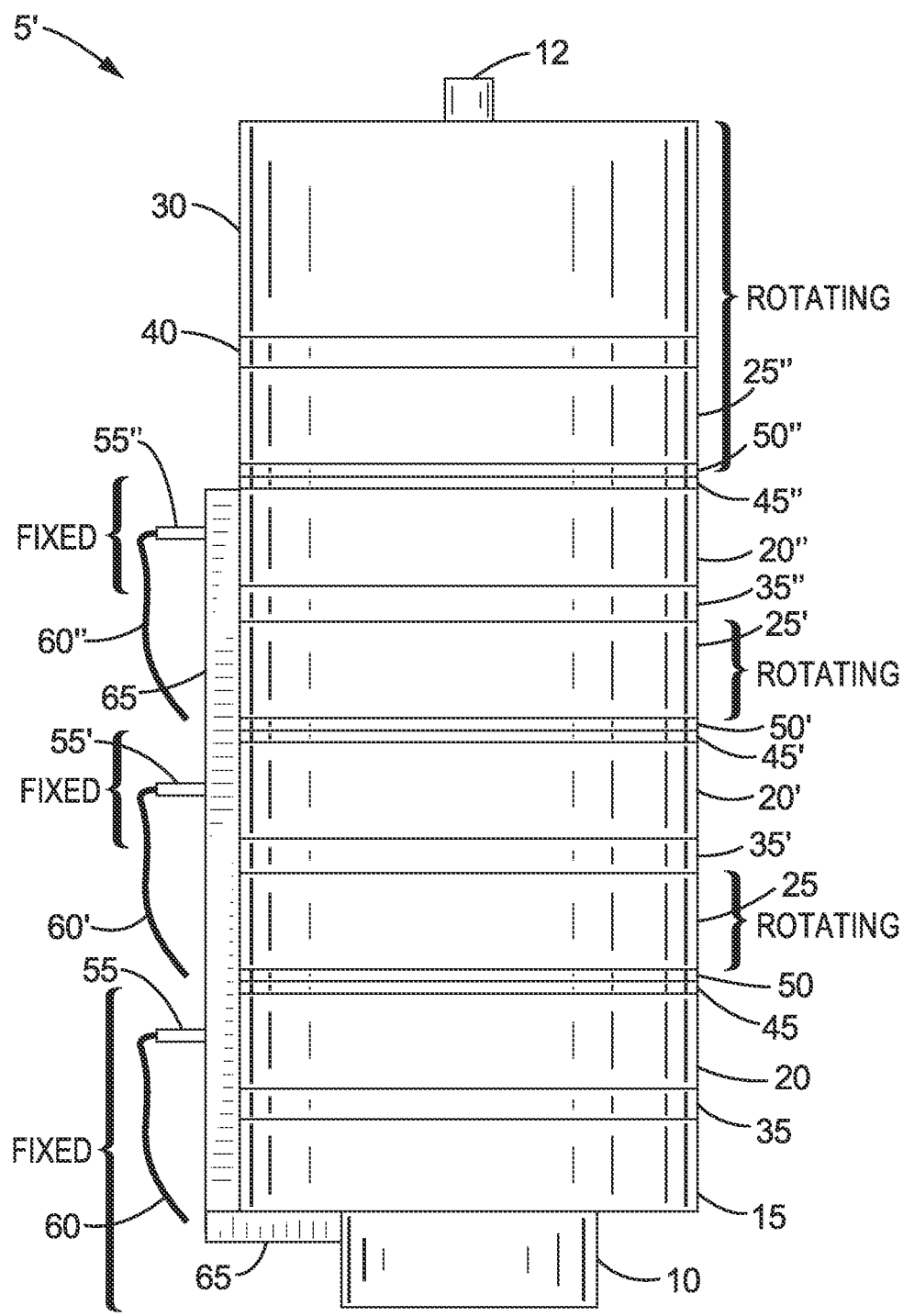
FIG. 4 is a side view of the subject invention showing three sets of paired sintered disks rotationally mounted about a central axle.
Figure 5:
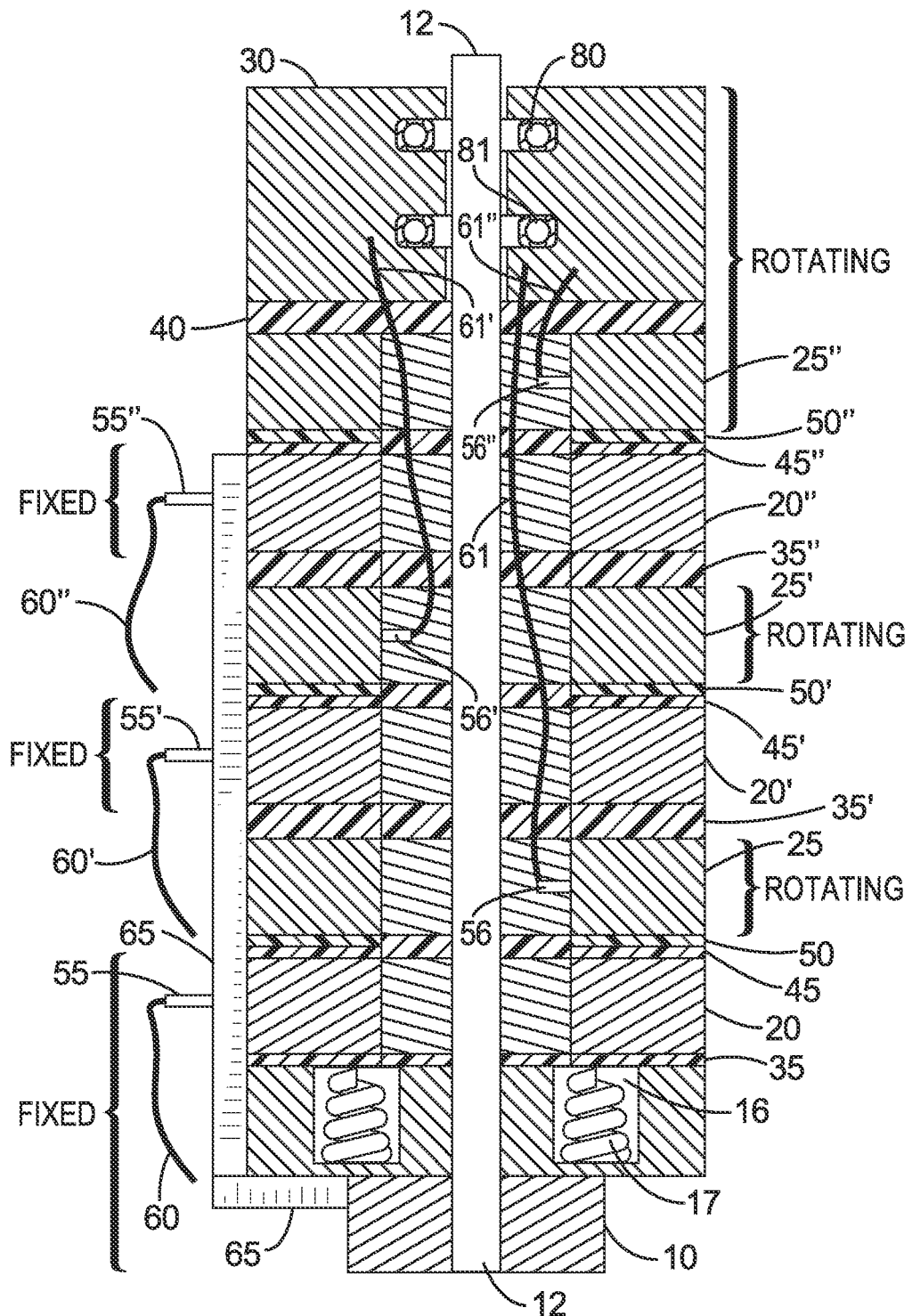
FIG. 5 is a side cross-sectional view of the subject invention showing three sets of paired sintered disks rotationally mounted about a central axle.

The subject invention or technology comprises a rotary transformer 5 (a single set of paired disks in FIGS. 1 and 3) and 5' (three sets of paired disks in FIGS. 4 and 5) utilized to transmit in one or more circuits electricity or an electric signal between a stationary or fixed environment and a rotating environment. For exemplary purposes only and not by way of limitation, the subject device 5 and 5' is designed to transmit electricity between an electricity producing source and an electricity consuming load. Either the source (e.g.: a generator, a battery, and the like) or the load (e.g.: a motor or similar device) may be fixed or rotating. For purposes of a general description, and not by way of limitation, FIGS. 1-5 present the load 30 (for exemplary purposes an electric motor) as rotating about a central axle 12 that is mounted to a fixed mount 10. The fixed mount 10 and central axle 12 are generally fabricated from a rigid metal or metal alloy material, but suitable polymeric materials are also contemplated to be within the realm of this disclosure. As is clear from the FIGS. 1-5, FIGS. 1 and 3 illustrate a single circuit having one paired set of electrically conductive disks 20 and 25 and FIGS. 4 and 5 show three sets of circuits having three paired sets of electrically conductive disks 20 and 25, 20' and 25', and 20" and 25".

Figure 2:
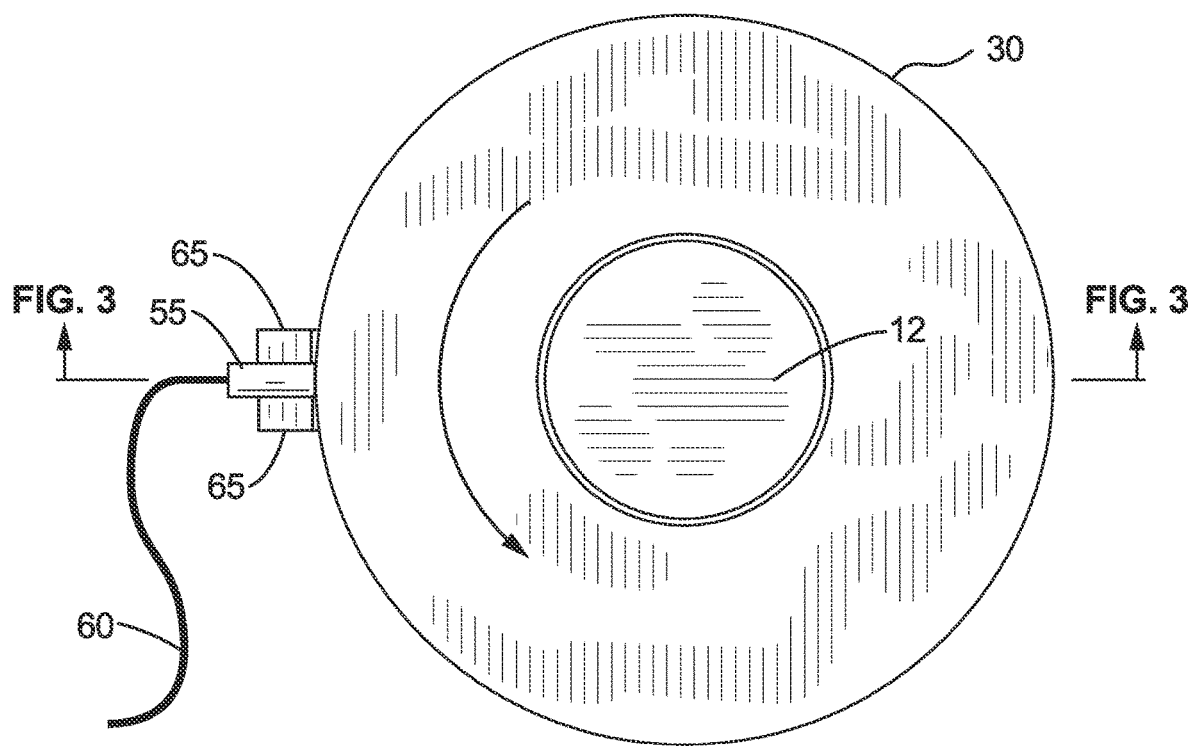
FIG. 2 is a top view of the subject invention showing a rotating load or power source spinning on a central axle.

FIG. 2 shows the top view of either the single paired set or three paired sets of disks since the structural differences between the two are not seen in a top view. The load 30 is shown as rotating about the central axle 12 during operation of the subject assembly 5. A stationary wiring input coupler 55 is seen on the left with a lead in wire 60. The coupler 55 is affixed to the electrically conducting fixed disk 20 to permit electricity to pass between the coupler 55 and the fixed disk 20. The coupler 55 is held in a fixed position by means of a coupler bracket 65 that extends to the fixed mount 10 and base spindle 15.

Figure 1:
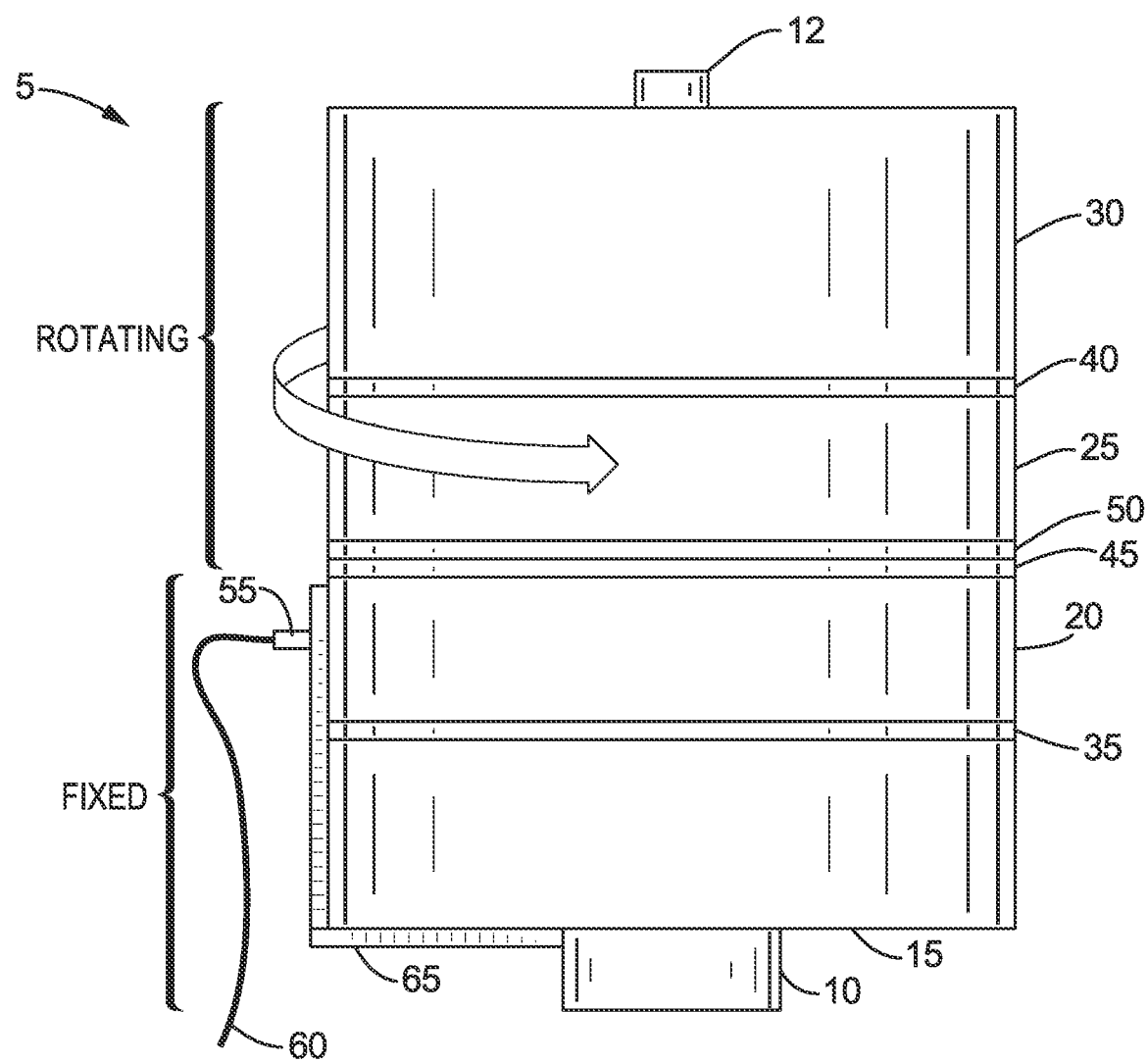
FIG. 1 is a side view of the subject invention showing a single set of paired sintered disks rotationally mounted about a central axle.

Specifically, FIGS. 1 and 2 show the subject rotary transformer 5. Specifically, FIG. 1 depicts the subject invention 5 having a stationary mount 10 and a base spindle 15. The base spindle 15 is usually fabricated from a non-electrically conducting and rigid material such as a polymer such as Delrin®, PEEK, various nylons, and other similar materials. An electrical insulating disk 35 is positioned over the spindle 15 and around the central axle 12. An electrically conducting fixed disk 20 is placed next to the insulating disk 35, about the central axle 12. Normally, the electrically conducting disk 20 is a lubricant-containing sintered/porous disk made from metals or metal alloys (one such readily commercially available sintered/porous material is termed Oilite™). Bronze, brass, steel, and the like are often utilized to produce the sintered/porous disks. The sintered/porous disks contain microscopic passageways which trap an applied lubricant (the boundary layer conductor (BLC)) within and slowly releases the BLC during operation.

The lubricant/BLC (boundary layer conductor) 45 and 50 may be natural and synthetic oils, with lighter SAE 10-50 preferred, but other viscosities are found to be within the realm of this disclosure. For a synthetic lubricant Valvoline 0-20 SAE functioned well, as do other equivalent similar natural and synthetic products. However, in particular, it was discovered that a liquid triacylglyceride (TAG) performed in a much superior fashion, as far as lifetime and favorable heat properties, and in a startlingly good manner. Representative TAGs are avocado oil, olive oil, peanut oil, castor oil and the like. Specifically, castor oil was found, for the purposes of the subject rotary transformer, to be an extremely good BCL or TAG lubricant and electrical conductor. Castor oil is a TAG with a high percentage of hydroxylated and unsaturated side chains. Extensive testing of the subject rotary transformers shows that under normal current passing conditions no additional lubricant is needed in approximately 1,300 hours of rotational operation, while the best synthetic lubricant, Valvoline 0-20 SAE, only lasted for 700 hours. Simple addition of another drop of castor oil after the 1,300 hours allowed for several hundred more hours of operations without structural failure.

Castor oil is a TAG that contains an unusually high percentage of ricinoyl substituents (85-95% of the fatty acid side chairs are ricinoyl groups) that are derived from ricinoleic acid (IUPAC name: (9Z,12R)-12-hydroxyoctadec-9-enoic acid) which is a hydroxylated unsaturated fatty acid. It is noted that the carbon-carbon double bonds are all in the cis configuration. Castor oil is derived from the castor tree, *Ricinus communis*.

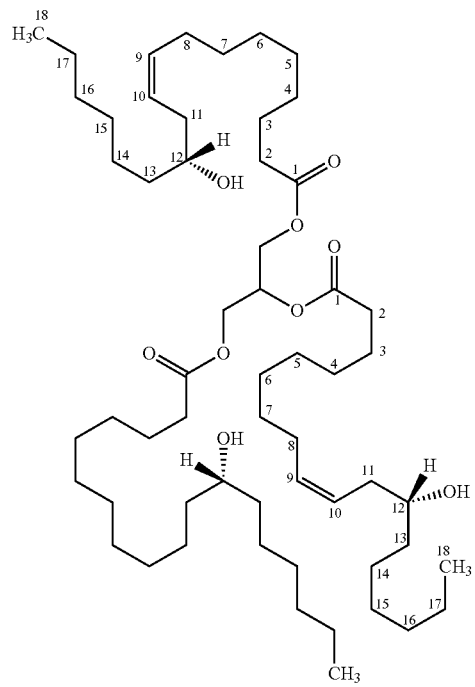

Structure I-Castor Oil (a TAG) with Ricinoyl Side Chains

Over many decades castor oil has been utilized as a lubricant for mechanical devices, however TAGs are considered to be poor conductors of electricity. The dielectric constant for castor oil is approximately 4.5 F/m, which indicates that under standard conditions it is an insulator. Clearly, the castor oil lubricant being utilized in the subject situation is not acting as an electrical insulator but is an exceptionally good conductor or BLC. Plainly, the prior art teaches directly away from castor oil being a good conductor for any purpose. Additionally, the viscosity of castor oil is over 10-fold greater than many naturally occurring fats and oils, therefore an excellent lubricant. At 20° C. the viscosity of castor oil is approximately 1000 η and decreases to about 128η at 50° C. It is within the realm of this disclosure that mixtures of standard lubricants (synthetic and naturally occurring) and TAGs may be utilized for the operation of the subject rotary transformer, but castor oil by itself or at a medium to high percentage of any mixture is preferred.

On the surface of the fixed sintered disks is a layer of the BLC or lubricant 45 that minimized frictional wear during operation, but needs to allow the passage of electrical power, so it is not an electrical insulating layer.

Figure 3:
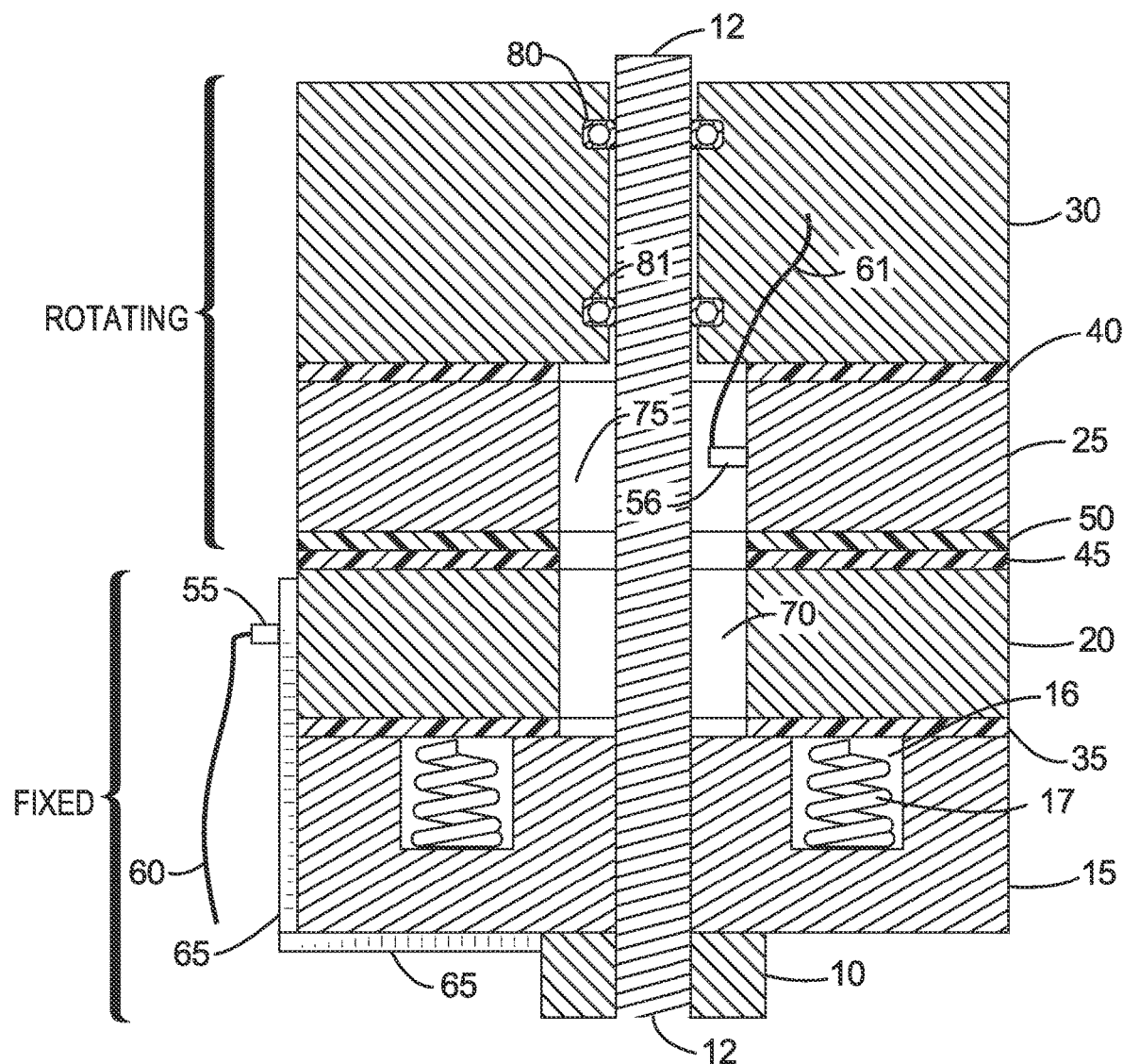
FIG. 3 is a cross-sectional side view of the subject invention showing a single set of paired sintered disks rotationally mounted about a central axle.

FIG. 3 is a side view of the single circuit embodiment of the subject invention. Clearly, the mount 10 is secured to the central shaft 12 upon which the load 30 rotates. The base spindle 15 holds resilient means 17, which are various types of springs, within apertures 16 or surrounding the central shaft 12. The insulating disk 35 rides over the resilient means 17 and is urged to compress the rotary transformer or slip ring assembly 5 to maintain electrical contact between the two electrically conductive disks 20 and 25. The surfaces of both electrically conductive disks 20 and 25 are coated with the BLC/lubricant 45 and 50, respectfully. During operation, movable disk 25 spins about the central shaft 12. The surfaces of the two electrically conductive disks slide over one another, thereby allowing the electricity to flow from the outside stationary environment to the rotating load.

As can be seen in FIG. 3, there are open regions 70 and 75 on the interior of each of the electrically conductive disks 20 and 25 that permit free rotation about the central shaft 12. Above the rotating electrically conductive disk 25 is another electrical insulator disk 40. As is depicted, an electrical lead 60 comes into the stationary electrically conductive disk 20 by a first coupler 55 mounted in the stationary bracket 65 that is affixed to the spindle 15 and mount 10. A second coupler 56 permits a second and interior wire 61 to lead from the rotating electrically conductive disk to the rotating load/motor 30. Bearings 80 and 81 allow the load to rotate on the central shaft 12.

FIGS. 4 and 5 show an embodiment of the subject rotary transformer in which three circuits (three separate incoming wires) exist, one circuit for each input of a three-phase electrical system (coupled to operate a three-phase motor, for example). It is stressed that more than one circuit is always possible for the subject invention, depending on the exact requirements of the system of interest for the necessities of the load. As is depicted, there are three sets of paired fixed/rotating electrically conducting disks 20 and 25, 20' and 25', and 20" and 25". As with the single pair of electrically conductive disks shown in FIGS. 1 and 3, electrically nonconductive disks are found at the bottom of the three paired sets 35 and at the top 40 and separating the other two paired electrically conductive disks are additional nonconductive disks 35' and 35". Exterior electrically wires 60, 60', and 60" attach to each of fixed electrically conductive disks 20, 20', and 20" by electrical coupler 55. 55', and 55", respectfully.

As seen in FIG. 5, each fixed/stationary electrically conductive disk 20, 20', and 20" are secured to the stationary bracket 65, while the rotating electrically conductive disks 25, 25', and 25" are associated/affixed with the rotating load 30 by means of electrical wires 61, 61', and 61" and electrical couplers 56, 56', and 56".

Experimental Testing

Rotary transformers were assembled and powered by suitable electric motors to test the effectiveness of the various boundary layer conductor materials for lifespan and heat characteristics. A constant load of 10 amps was passed through each rotary transformer and each was operated at 2500 RPM by a driver motor.

Castor Oils Tested:

Various castor oils were tested, and all ran at about the same temperature range of 78° C., including:
1) Klotz Benol, castor oil blend, ran for approximately 650 hours before failure.
2) Nature's Mace, 100% castor oil, ran for approximately 950 hours before failure.
3) Barr, 100% castor oil, ran for approximately 650 hours before failure.
4) Fine Vine, 100% castor oil, ran for approximately 1300 hours before failure. It is noted that an additional drop of this oil allowed the rotary transformer to perform for several hundred more hours. Further, at 4000 RPM and 10 amps it ran for over 1000 hours.

Various Non-Castor Oils Tested:
1) Chosen Foods avocado oil, ran for approximately 240 hours before failure and ran hot at about 104° C.
2) Signature Select peanut oil, ran approximately 50 hours before failure and ran hot at about 105° C.
3) Signature Select olive oil, ran approximately 240 hours before failure and ran hot at about 95° C.
4) Signature Select grape seed oil, ran approximately 270 hours before failure and ran hot at about 100° C.
5) Valvoline Synth 15-50W, failed after a few hundred hours and ran hot at about 124° C.
6) Mobil 1 Synth 15-50W, failed after a few hundred hours and ran hot at about 122 to 160° C.
7) Super Tech Synth 75-140W, failed after a few hundred hours and ran hot at 116 to 151° C.
8) Valvoline Synth 0-20W, failed after a few hundred hours and ran hot at 80 to 129° C.

A first embodiment of the subject technology includes a rotary transformer for use in a selected application for transferring electrical power between a stationary exterior environment and a rotating interior environment, comprising: a non-rotating electrical conductor, comprising: a first sintered metallic contacting surface and a first electrical connection coupling the non-rotating electrical conductor to a stationary exterior member; a rotating electrical conductor, comprising a second sintered metallic contacting surface and a second electrical connection coupling the rotating electrical conductor to a rotating interior member; and a boundary layer conductor applied to both the first and second sintered metallic contacting surfaces to facilitate motion of the second sintered metallic contacting surface over the first sintered metallic contacting surface during rotation, while allowing electrical current to flow between the non-rotating and the rotating electrical conductors. Additional embodiments include the boundary layer conductor being a triacylglyceride, a hydroxylated and unsaturated triacylglyceride, and castor oil.

A second embodiment of the subject technology comprises a rotary transformer for use in a selected application for transferring electrical power between a stationary exterior environment and a rotating interior environment, comprising: a plurality of paired non-rotating electrical and rotating electrical conductors, wherein each pair is isolated from the other by an electrical insulating member, wherein said non-rotating electrical conductor, comprises: a first sintered metallic contacting surface and a first electrical connection coupling said non-rotating electrical conductor to a stationary exterior member; and the rotating electrical conductor, comprises; a second sintered metallic contacting surface and a second electrical connection coupling the rotating electrical conductor to a rotating interior member; and a boundary layer conductor applied to both the first and second sintered metallic contacting surfaces to facilitate motion of the second sintered metallic contacting surface over the first sintered metallic contacting surface during rotation, while allowing electrical current to flow between the non-rotating and the rotating electrical conductors. Further embodiments include the boundary layer conductor being a triacylglyceride, a hydroxylated and unsaturated triacylglyceride, and castor oil.

A third embodiment of the subject technology comprises a rotary transformer for transmitting electricity between a first stationary location and a second rotating location, comprising: a pair of electrically conductive disks with each disk having a central aperture that comprise: a first stationary sintered disk having an inner aperture edge and an outer perimeter edge and a second rotating sintered disk having an inner aperture edge and an outer perimeter edge; a first stationary location electrical connection attached to the first stationary sintered disk's outer aperture edge; a second rotating location electrical connection attached to the second rotating sintered disk's inner perimeter edge; a spindle housing surrounding the pair of electrically conductive disks, wherein the spindle housing permits the pair of electrically conductive disks to rotate on one another; and a boundary layer conductor applied to both the first stationary and the second rotating sintered disks to facilitate motion of the first and second disks during rotation, while allowing electrical current to flow between the stationary and rotating electrically conductive disks. Embodiments include the boundary layer conductor being a triacylglyceride, a hydroxylated and unsaturated triacylglyceride, and castor oil.

From the description herein, it will be appreciated that the present disclosure encompasses multiple implementations of the technology which include, but are not limited to, the following:

A rotary transformer for use in a selected application for transferring electrical power between a stationary exterior environment and a rotating interior environment, comprising: a. a non-rotating electrical conductor, comprising: i. a first sintered metallic contacting surface and ii. a first electrical connection coupling said non-rotating electrical conductor to a stationary exterior member; b. a rotating electrical conductor, comprising i. a second sintered metallic contacting surface and ii. a second electrical connection coupling said rotating electrical conductor to a rotating interior member; and c.

a boundary layer conductor applied to both said first and second sintered metallic contacting surfaces to facilitate motion of said second sintered metallic contacting surface over said first sintered metallic contacting surface during rotation, while allowing electrical current to flow between said non-rotating and said rotating electrical conductors.

A rotary transformer for use in a selected application for transferring electrical power between a stationary exterior environment and a rotating interior environment, comprising: a. a plurality of paired non-rotating electrical and rotating electrical conductors, wherein each pair is isolated from another by an electrical insulating member, wherein said non-rotating electrical conductor, comprises: i. a first sintered metallic contacting surface and ii. a first electrical connection coupling said non-rotating electrical conductor to a stationary exterior member; and said rotating electrical conductor, comprises: i. a second sintered metallic contacting surface and ii. a second electrical connection coupling said rotating electrical conductor to a rotating interior member; and b. a boundary layer conductor applied to both said first and second sintered metallic contacting surfaces to facilitate motion of said second sintered metallic contacting surface over said first sintered metallic contacting surface during rotation, while allowing electrical current to flow between said non-rotating and said rotating electrical conductors.

A rotary transformer for transmitting electricity between a first stationary location and a second rotating location, comprising: a. a pair of electrically conductive disks with each disk having a central aperture that comprise: i. a first stationary sintered disk having an inner aperture edge and an outer perimeter edge and ii. a second rotating sintered disk having an inner aperture edge and an outer perimeter edge; b. a first stationary location electrical connection attached to said first stationary sintered disk's outer aperture edge; c. a second rotating location electrical connection attached to said second rotating sintered disk's inner perimeter edge; d. a spindle housing surrounding said pair of electrically conductive disks, wherein said spindle housing permits said pair of electrically conductive disks to rotate on one another; and e. a boundary layer conductor applied to both said first stationary and said second rotating sintered disks to facilitate motion of said first and second disks during rotation, while allowing electrical current to flow between said stationary and rotating electrically conductive disks.

A rotary transformer according to any preceding implementation, wherein said boundary layer conductor is a triacylglyceride.

A rotary transformer according to any preceding implementation, wherein said boundary layer conductor is a hydroxylated and unsaturated triacylglyceride.

A rotary transformer according to any preceding implementation, wherein said boundary layer conductor is castor oil.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A rotary transformer for use in a selected application for transferring electrical power between a stationary exterior environment and a rotating interior environment, comprising:
   a. a non-rotating electrical conductor, comprising:
      i. a first sintered metallic contacting surface and
      ii. a first electrical connection coupling said non-rotating electrical conductor to a stationary exterior member;
   b. a rotating electrical conductor, comprising
      i. a second sintered metallic contacting surface and
      ii. a second electrical connection coupling said rotating electrical conductor to a rotating interior member; and
   c. a boundary layer conductor applied to both said first and second sintered metallic contacting surfaces to facilitate motion of said second sintered metallic contacting surface over said first sintered metallic contacting surface during rotation, while allowing electrical current to flow between said non-rotating and said rotating electrical conductors.

2. A rotary transformer according to claim 1, wherein said boundary layer conductor is a triacylglyceride.

3. A rotary transformer according to claim 1, wherein said boundary layer conductor is a hydroxylated and unsaturated triacylglyceride.

4. A rotary transformer according to claim 1, wherein said boundary layer conductor is castor oil.

5. A rotary transformer for use in a selected application for transferring electrical power between a stationary exterior environment and a rotating interior environment, comprising:
   a. a plurality of paired non-rotating electrical and rotating electrical conductors, wherein each pair is isolated from another by an electrical insulating member, wherein said non-rotating electrical conductor, comprises:
      i. a first sintered metallic contacting surface and
      ii. a first electrical connection coupling said non-rotating electrical conductor to a stationary exterior member; and said rotating electrical conductor, comprises:
      i. a second sintered metallic contacting surface and
      ii. a second electrical connection coupling said rotating electrical conductor to a rotating interior member; and
   b. a boundary layer conductor applied to both said first and second sintered metallic contacting surfaces to facilitate motion of said second sintered metallic contacting surface over said first sintered metallic contacting surface during rotation, while allowing electrical current to flow between said non-rotating and said rotating electrical conductors.

6. A rotary transformer according to claim 5, wherein said boundary layer conductor is a triacylglyceride.

7. A rotary transformer according to claim 5, wherein said boundary layer conductor is a hydroxylated and unsaturated triacylglyceride.

8. A rotary transformer according to claim 5, wherein said boundary layer conductor is castor oil.

9. A rotary transformer for transmitting electricity between a first stationary location and a second rotating location, comprising:
   a. a pair of electrically conductive disks with each disk having a central aperture that comprise:
      i. a first stationary sintered disk having an inner aperture edge and an outer perimeter edge and
      ii. a second rotating sintered disk having an inner aperture edge and an outer perimeter edge;
   b. a first stationary location electrical connection attached to said first stationary sintered disk's outer aperture edge;
   c. a second rotating location electrical connection attached to said second rotating sintered disk's inner perimeter edge;
   d. a spindle housing surrounding said pair of electrically conductive disks, wherein said spindle housing permits said pair of electrically conductive disks to rotate on one another; and
   e. a boundary layer conductor applied to both said first stationary and said second rotating sintered disks to facilitate motion of said first and second disks during rotation, while allowing electrical current to flow between said stationary and rotating electrically conductive disks.

10. A rotary transformer according to claim 9, wherein said boundary layer conductor is a triacylglyceride.

11. A rotary transformer according to claim 9, wherein said boundary layer conductor is a hydroxylated and unsaturated triacylglyceride.

12. A rotary transformer according to claim 9, wherein said boundary layer conductor is castor oil.

* * * * *